Nov. 16, 1937.   F. H. TRAVERS   2,099,580
SWITCH HANDLE
Filed Jan. 25, 1936
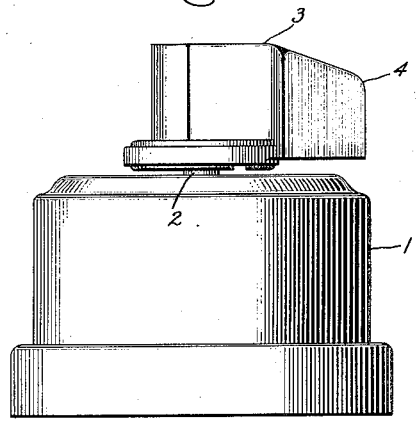
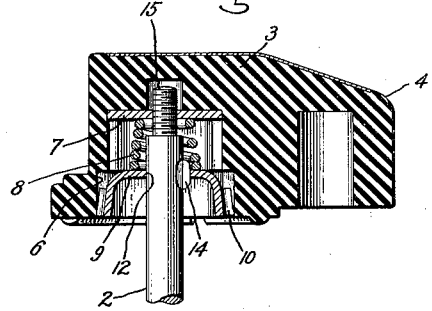
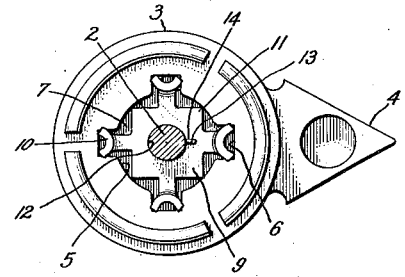
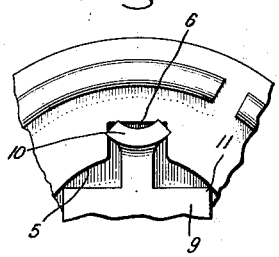
Inventor:
Fred H. Travers
by *Harry E. Dunham*
His Attorney.

Patented Nov. 16, 1937

2,099,580

UNITED STATES PATENT OFFICE 2,099,580

SWITCH HANDLE

Fred H. Travers, Stratford, Conn., assignor to General Electric Company, a corporation of New York Application January 25, 1936, Serial No. 60,866

6 Claims. (Cl. 287—53)

The present invention relates to handles for electric switches and the like.

The object of my invention is to provide an improved construction and arrangement in handles of this type, and for a consideration of what I believe to be novel and my invention attention is directed to the following description and the claims appended thereto.

In the accompanying drawing, Fig. 1 is a side elevation of a handle embodying my invention mounted on a rotary electric switch; Fig. 2 is a sectional elevation of the handle showing the manner of attaching the handle to the operating shaft of the switch; Fig. 3 is a bottom plan view of the switch handle; and Fig. 4 is an enlarged view of part of Fig. 3.

Referring to the drawing, the numeral 1 indicates a rotary electric switch having an operating shaft or spindle 2. To the end of the spindle 2 is secured a switch handle which comprises a body 3 of suitable molded insulating material such as molded artificial resin. As shown in Fig. 3, the body has a point 4 formed integral therewith which serves to indicate the position of the switch. On the under side of the body 3 of the handle is a cavity 5 having four axially extending grooves 6 in the side walls thereof. At the bottom of the cavity is a nut 7. The nut is resiliently held against the bottom of the cavity by a coil spring 8 which is held in place by a metal member 9 which is forced into the cavity. The metal member 9 is made from relatively thin sheet metal and has four prongs 10 which fit in the grooves 6 and frictionally hold the metal member 9 in place when it is pressed into the cavity. As shown in Fig. 3, one of the prongs 10 is larger than other prongs so that the member 9 has a definite position in the handle. The prongs 10 extend in a direction opposite to the direction of insertion of the member 9 and are inclined toward the side walls of the cavity so that the prongs are flexed or bent inwardly by engagement with the side walls of the cavity as the member 9 is pressed into the cavity. This means that the points of the prongs tend to dig into the side walls of the cavity and thereby prevent removal of the member 9. As shown in Figs. 3 and 4, the prongs 10 are arch shaped and contact the side walls of the grooves 6 along each edge. Due to the arch shape, the compressive forces exerted on the edges of the prong tend to flex the prong intermediate its edges and thereby maintain the edges of the prong in intimate contact with the side walls of the groove. During insertion of the prongs, the edges of the prongs cut into the side walls of the groove and the edges are therefore in intimate contact with the groove. Due to this intimate contact, it is not necessary to serrate the edges of the prongs in order to hold the prongs securely in the grooves. The flexing of the prongs intermediate their edges and the inward bending of the prongs during insertion of the member 9 limit the forces exerted on the side walls of the cavity thereby decreasing the likelihood of breaking the side walls of the cavity during the insertion of the member 9. The member 9 is also provided with sharp corners 11 which may contact the side walls of the cavity and further assist in holding the member therein. At the center of the member 9 is a hole 12 through which the shaft 2 projects and a keyway 13 into which projects a key 14 struck up on the shaft 2.

The manner of assembling the switch handle to the shaft 2 is clearly shown in Fig. 2. The end of the shaft 2 is inserted through the opening 12 and the threaded end 15 of the shaft is partially threaded into the nut 7. An upward force is then exerted on the handle lifting the member 9 clear of the key 14 and compressing the coil spring 8 between the member 9 and the nut 7. The handle is then turned threading the end 15 of the shaft further into the nut 7. When the nut 7 is sufficiently threaded on the shaft 2, the handle is released and turned until the key 14 and the keyway 13 are in line. The coil spring 8 then forces the keyway 13 over the key and thereby couples the switch handle to the switch operating shaft. The handle may be removed from the shaft 2 by reversing the assembly operations.

What I claim as new and desire to secure by Letters Patent of the United States is:

1. A handle comprising a body of insulating material having a cavity therein, and means for connecting said handle to a member to be operated thereby including a metal member having a prong pressed into said cavity and frictionally held therein by engagement of the edges of the prong with the cavity, said prong having an arch-shaped portion so that the compressive forces exerted on the edges of the prong tend to flex the prong intermediate its edges.

2. A handle comprising a body of insulating material having a cavity therein, and means for connecting said handle to a member to be operated thereby including a metal member having a prong pressed into said cavity and frictionally held therein by engagement of the edges of the prong with the cavity, the material of the prong being relatively thin compared to the width of the prong and having sharp cornered edges, said prong having an arch-shaped portion so that the compressive forces exerted on the edges of the prong tend to flex the prong intermediate its edges.

3. A handle comprising a body of insulating material having a cavity therein with axially extending grooves in the side walls thereof, and means for connecting said handle to a member to be operated thereby including a metal member pressed into said cavity, said member having a plurality of prongs extending in a direction opposite to the direction of insertion of said member the edges of which are wedged across and frictionally engage the side walls of said grooves and hold the member therein.

4. A handle comprising a body of insulating material having a cavity therein with axially extending grooves in the side walls thereof, and means for connecting said handle to a member to be operated thereby including a metal member pressed into said cavity, said member having a plurality of prongs extending in a direction opposite to the direction of insertion of said member the edges of which frictionally engage the side walls of said grooves and hold the member therein, said prongs being relatively thin compared with the width of the prongs and having sharp cornered edges and having an arch-shaped portion so that the compressive forces exerted on the edges of the prong tend to flex the prong intermediate its edges.

5. A handle comprising a body of insulating material having a cavity therein with an axially extending groove in the side walls thereof, and means for connecting said handle to a member to be operated thereby including a metal member pressed into said cavity, said member having an arch-shaped prong the edges of which engage the side walls of said groove and frictionally hold said metal member therein, said prong being relatively thin compared with the width of the prong so that the compressive forces exerted on the edges of the prong tend to flex the prong intermediate its edges.

6. A handle comprising a body of insulating material having a cavity therein with an axially extending groove in the side walls thereof, and means for connecting said handle to a member to be operated thereby including a metal member pressed into said cavity, said member having an arch-shaped prong having sharp cornered edges, the corners of which engage the side walls of said groove and frictionally hold said metal member therein, said prong being relatively thin compared with the width of the prong so that the compressive forces exerted on the corners of the edges of the prong tend to flex the prong intermediate its edges.

FRED H. TRAVERS.